(12) United States Patent
Deuschle et al.

(10) Patent No.: US 9,071,982 B2
(45) Date of Patent: Jun. 30, 2015

(54) METHOD AND APPARATUS FOR PROVIDING LOCAL LOOP INFORMATION

(75) Inventors: Matthew Deuschle, Lee's Summit, MO (US); Fernando Bastos, Danville, CA (US); David Walter Byrne, Allen, TX (US); Wayne Fiskum, Salida, CA (US); Terry Michael Herron, Gillespie, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1405 days.

(21) Appl. No.: 12/346,485

(22) Filed: Dec. 30, 2008

(65) Prior Publication Data

US 2010/0167720 A1    Jul. 1, 2010

(51) Int. Cl.
*H04M 1/00* (2006.01)
*H04W 24/02* (2009.01)
*H04W 84/14* (2009.01)

(52) U.S. Cl.
CPC ............. *H04W 24/02* (2013.01); *H04W 84/14* (2013.01)

(58) Field of Classification Search
CPC . H04M 2203/055; H04M 3/304; H04M 1/24; H04M 3/2209; H04M 3/30; H04M 3/2254; H04M 3/22; H04M 3/323; H04M 3/28; H04M 3/301; H04M 3/18; H04M 3/36; H04M 11/062; H04M 3/42323; H04M 15/08; H04B 3/46; H04Q 3/00
USPC ........... 379/22.01, 22.04, 27.01, 207.04, 377, 379/1.01, 1.03, 1.04, 9.03, 9, 9.04, 10.01, 379/12, 15.03, 22, 22.05, 23, 24, 27.03, 379/29.01, 29.05, 29.08, 29.09, 30, 32.01, 379/32.02, 32.04, 93.01, 246
See application file for complete search history.

(56) References Cited

U.S. PATENT DOCUMENTS

| | | | | |
|---|---|---|---|---|
| 5,764,633 | A | * | 6/1998 | Bell et al. ................ 370/386 |
| 5,790,531 | A | * | 8/1998 | Ellebracht et al. ........... 370/242 |
| 2005/0111628 | A1 | * | 5/2005 | Beamon ................... 379/27.01 |
| 2010/0141466 | A1 | * | 6/2010 | Nguyen et al. ............ 340/687 |

FOREIGN PATENT DOCUMENTS

WO    WO 0113609 A1 *   2/2001

* cited by examiner

*Primary Examiner* — Akelaw Teshale

(57) ABSTRACT

A method and apparatus for providing local loop information in a network are disclosed. For example, the method receives a request for local loop information pertaining to a transmission channel, and determines if the transmission channel has one or more local loops. The method retrieves data associated with the one or more local loops if the transmission channel has one or more local loops, and analyzes the data associated with the one or more local loops to determine at least one facility type that supports the transmission channel.

14 Claims, 5 Drawing Sheets

METHOD AND APPARATUS FOR PROVIDING LOCAL LOOP INFORMATION

The present invention relates generally to communication networks and, more particularly, to a method and apparatus for providing local loop information in a network, e.g., a switched and/or Internet Protocol (IP) network.

BACKGROUND OF THE INVENTION

A network service provider may need to determine information about a local loop. In one example, the service provider may be interested in making network upgrades to better meet customer need. However, the information to be used for assessing the customer need may not be readily available to the network service provider.

For example, the service provider may have a cellular service provider as a customer. The cellular service provider may subscribe to a transmission facility (e.g., a 1.544 Mbits/second transmission facility) from a Central Office (CO) of the network service provider to the cellular service provider's cell site. The quality of the service that the cellular service provider supports may be affected by the quality of the transmission facility the cellular service provider obtains from the network service provider. For example, copper-based and fiber optic-based transmission facilities may have different performance levels. For example, a fiber optic-based facility is advantageous because it is not affected by an electromagnetic field, whereas a copper-based facility is more readily available to an end user (e.g., closer to the cell phone user). In order to meet the needs of the cellular service provider, the network service provider may then need information about the local loop on which the transmission facility is provided.

SUMMARY OF THE INVENTION

In one embodiment, the present invention discloses a method and apparatus for providing local loop information in a network. For example, the method receives a request for local loop information pertaining to a transmission channel, and determines if the transmission channel has one or more local loops. The method retrieves data associated with the one or more local loops if the transmission channel has one or more local loops, and analyzes the data associated with the one or more local loops to determine at least one facility type that supports the transmission channel.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
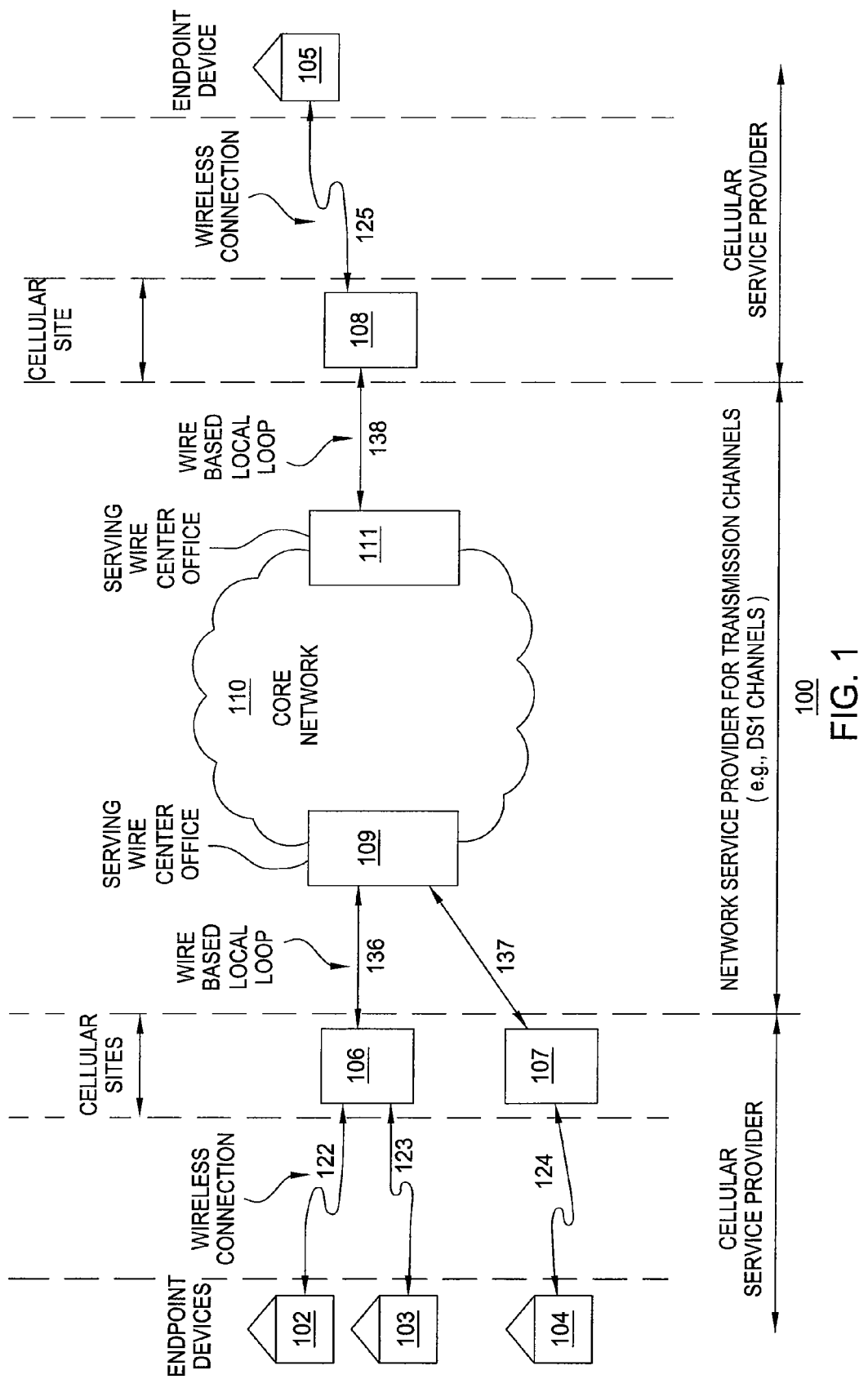
FIG. 1 illustrates an exemplary network related to the present invention.

The present invention broadly discloses a method and apparatus for providing local loop information in a network, e.g., a switched and/or Internet Protocol (IP) network. FIG. 1 illustrates a block diagram depicting an exemplary network 100 related to the current invention. Exemplary networks include switched networks, Internet protocol (IP) networks, Asynchronous Transfer Mode (ATM) networks, frame-relay networks, and the like.

A switched network is broadly defined as a network that creates continuous pathways between callers and called parties by disconnecting and reconnecting lines in various configurations (i.e. by switching). ATM, frame-relay and IP networks, and the like are packet-based networks. An IP network is broadly defined as a network that uses Internet Protocol such as IPv4 or IPv6 and the like, to exchange data packets.

In one embodiment, the network 100 may comprise a plurality of endpoint devices 102-105 communicating with cellular sites 106-108 via a wireless connections 122-125. The cellular sites 106-108 communicate with a Serving Wire Center (SWC) office 109 or 111 located on the core network 110 via local loops 136-138. The SWC offices 109 and 111 provide termination and switching functions for transmission channels and may also be referred to as central offices.

The endpoint devices 102-105 may comprise customer endpoint devices such as cell phones, personal computers, laptop computers, Personal Digital Assistants (PDAs), servers, routers, and the like. The local loops 136-138 are typically wire-based and serve as a means to establish a connection between the cell sites 106-108 and one or more of the SWC offices 109 and 111.

For example, endpoint device 105 may communicate with cellular site 108 via wireless connection 125. Similarly endpoint device 102 may communicate with cellular site 106 via wireless connection 122, endpoint device 103 may communicate with cellular site 106 via wireless connection 123, and endpoint device 104 may communicate with cellular site 107 via wireless connection 124. The cellular sites 106 and 107 may communicate with the SWC office 109 located in core network 110 via the local loops 136 and 137, respectively. Similarly, the cellular site 108 may communicate with the SWC office 111 located in core network 110 via the local loop 138.

For example, traffic from endpoint device 102 to endpoint 105 will traverse over the wireless connection 122, the cell site 106, the local loop 136, the core network 110 (from SWC office 109 to SWC office 111), the local loop 138, and the wireless connection 125. Similarly, traffic from the endpoint device 105 to the endpoint device 102 will traverse over the wireless connection 125, the cell site 108, the local loop 138, the core network 110 (from SWC office 111 to SWC office 109), the local loop 136, and the wireless connection 122.

The local loops 136-138 may each comprise a plurality of spans. A span refers to the physical link between repeaters. The physical link for each span may be copper wire-based and/or fiber optic cable-based.

It should be noted that although only four endpoint devices, three cell sites and two SWC offices are depicted in FIG. 1, the communication network 100 may be expanded by including additional endpoint devices, cell sites, SWC offices, $3^{rd}$ party networks, application servers, databases, and the like without altering the scope of the present invention.

The above network is described to provide an illustrative environment in which packets for voice, data and multimedia services are transmitted on switched and/or IP networks. In one embodiment, the cellular service provider may be a customer of the network service provider. For example, the cellular service provider may subscribe to transmission channels for carrying traffic between the various cell sites. For example, the cellular service provider may subscribe to a plurality of Digital Signaling Level 1 (DS1) channels interconnecting the various cell sites 106-108. A DS1 channel refers to a 1.544 Mb/s channel. The network service provider may then provide the DS1 transmission channels between the various cell sites and SWC offices. For example, a DS1 channel may interconnect cell site 106 to cell site 108, another DS1 channel may interconnect cell site 107 to SWC office 111, etc.

In one embodiment, the network service provider may need to determine information about a local loop. For example, the service provider may be interested in making network upgrades to better meet customer need, e.g., the cellular service provider's need. However, the information to be used for assessing the need may not be readily available. For example, the quality of the service that the cellular service provider supports may be affected by the quality of the transmission facility on which the DS1 channel is provided. For example, copper-based and fiber optic-based transmission facilities may have different performances. For example, a fiber optic-based facility is not affected by an electromagnetic field whereas a copper-based facility may be more readily available to the end user (e.g., being closer to the cell phone user), thereby reducing the power loss. In order to meet the needs of the cellular service provider, the network service provider may then need information about the local loop on which the transmission channel is supported.

In one embodiment, the present invention discloses a method and apparatus for providing local loop information in a network. In one embodiment, local loop information comprises information relating to the particular type of loop technology that forms the underlying local loop, e.g., copper-based technology, fiber-based technology, or a hybrid-based technology. Broadly, copper-based technology comprises the use of a circuit riding on a copper pair all the way from a central office to a customer's interface, whereas fiber-based technology comprises the use of a circuit riding on an optical fiber pair all the way from a central office to a customer's interface. Finally, hybrid-based technology comprises the use of a fiber/copper combination implementation, e.g., using a circuit riding on an optical fiber pair from a central office to a remote terminal, and then using a circuit riding on a copper pair from the remote terminal to a customer's interface.

Figure 2:
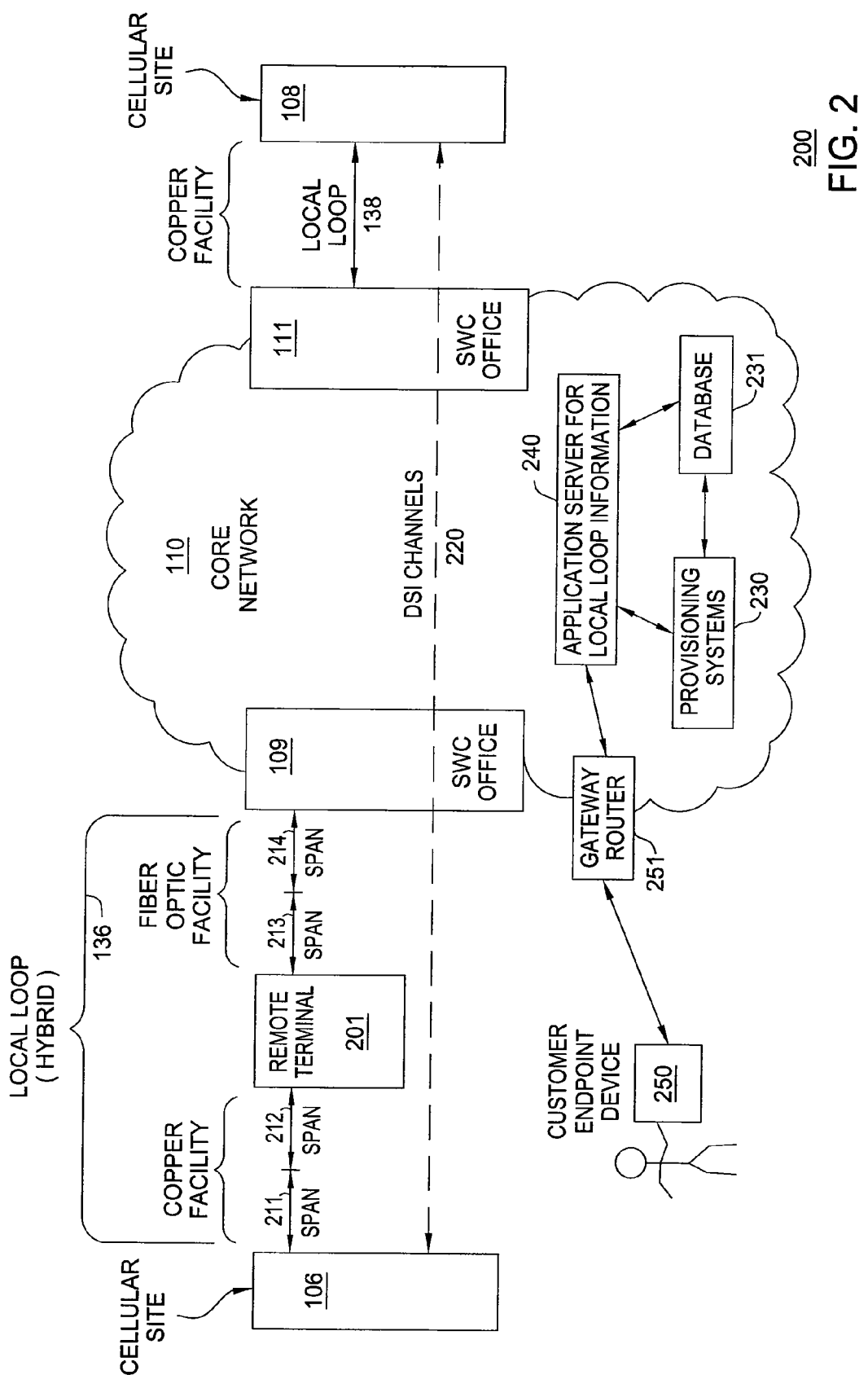
FIG. 2 illustrates an exemplary network for providing local loop information in a network.

FIG. 2 illustrates an exemplary network 200 for providing local loop information in a network. For example, the cellular site 106 may communicate with the SWC office 109 located on the core network 110 via a local loop 136. Similarly, the cellular site 108 may communicate with the SWC office 111 located on the core network 110 via a local loop 138.

In an illustrative example, the local loop 138 may comprise a single span and the span is over a copper-based facility. In contrast, the local loop 136 comprises a plurality of spans 211-214. For example, spans 211 and 212 are over copper-based facilities, and spans 213 and 214 are over fiber optic-based facilities. A remote terminal 201 is used as a conversion device between the optical signals and electrical signals carried on the fiber optic 212 and copper 213 based facilities, respectively. A DS1 channel 220 interconnects the cell site 106 to cell site 108. For example, traffic from cell site 106 to cell site 108 traverses over the spans 211-214, the SWC 109, the core network 110 from SWC office 109 to SWC office 111 and local loop 138. Similarly, traffic from cell site 108 to cell site 106 traverses over the local loop 138, the core network 110 from SWC office 111 to SWC office 109, and the spans 214-211.

In one embodiment, the core network 110 comprises an application server 240, one or more provisioning systems 230, one or more databases 231 and a gateway router 251. The application server 240, the one or more provisioning systems 230 and the one or more databases 231 are interconnected for sharing information and communicating with customer endpoint devices, e.g., customer endpoint device 250. In one embodiment, the network service provider may implement the current invention for providing local loop information in the application server 240. The customer endpoint device 250 can then be used to interact with the application server 240 via the gateway router 251 to access the local loop information.

In one embodiment, the method first identifies the transmission channel. For example, the application server 240 may access provisioning systems 230 and databases 231 to retrieve records for the transmission channels, e.g., DS1 channels. The method may then determine the number of local loops for a particular channel, e.g., no local loop, one local loop, two local loops and so on. For the example above, if the DS1 channel is between two SWC offices, then the DS1 has no local loop. If the DS1 channel is between two cellular sites and the DS1 channel extends from a SWC office to a cellular site in both locations, then the DS1 channel has two local loops.

If the DS1 channel extends to a cellular site only on one end, then it has only one local loop. However, if the DS1 channel only has one local loop, the method then identifies which end of the DS1 channel has the local loop. The two ends of the DS1 channel may be referred to as an "A" end and a "Z" end for the channel. The method then identifies for each end (e.g., "A" and "Z" ends), whether or not the channel has a local loop.

In one embodiment, the method is capable of determining the local loop information for each individual channel. For example, various applications may need to inquire as to the exact type of facilities that are currently deployed to support a particular transmission channel. Thus, in one embodiment, the local loop information for a transmission channel comprises the facility type. For example, the local loop information may be whether the facility is fiber-based, copper-based or hybrid-based. For example, a DS1 channel may have a fiber-based facility at the "Z" end while it has a hybrid facility at the "A" end.

In one embodiment, the method is capable of processing a request for obtaining local loop information. For example, if the requested local loop information pertains to the facility type for a channel, e.g., a DS1 channel, the method may then identify each span for each local loop associated with the channel. The method then determines the type of facility for each span. The facility type for the local loop may then be identified as either a copper, fiber or hybrid facility type. For example, if all spans for a local loop comprise only copper facilities, then the facility type for the local loop is identified as being copper-based. If all spans for a local loop comprise only fiber optic-based facilities, then the facility type for the local loop is identified as fiber-based. If at least one span is fiber and at least one span is copper, then the facility type for the local loop is identified as being hybrid-based.

In one embodiment, the local loop information further comprises the type of customer associated with a transmission channel. For example, the DS1 channel may be for a wholesale customer, a retail customer, an affiliate, a resale customer, a POP (point of presence) customer, etc. The information may be useful for determining a network migration plan, for identifying high-end customers in support of marketing efforts, and so on.

In one embodiment, the local loop information may further comprise maintenance and repair records, performance records, etc. For example, network maintenance personnel may wish to determine if customer complaints are linked to a type of local loop facility. Network upgrades may then be rolled out accordingly. For example, copper-based facilities may be replaced by fiber optic-based facilities.

In one embodiment, if the requested local loop information comprises the facility type, then the method may also provide the length of the facility. For example, the facility may be one mile long, two mile long and so on.

It should be noted that in order to respond to a request for the local loop information, the present method will need to analyze the information for each span and/or for the entire local loop. For example, determining the facility type for a transmission channel will require analyzing the information relating to each span that supports the entire transmission channel. It should be further noted that the request may comprise a plurality of parameters, e.g., a request that queries whether a particular type of customer is supported by transmission channels having only copper-based facilities, only fiber-based facilities, only hybrid-based facilities, or combination thereof. To process these requests from a user, a customer, or personnel of the network service provider requires that such information are properly stored and organized, e.g., by the application server 240.

Thus, in one embodiment, the method may then provide the requested local loop information to a user or a customer. In another example, a network engineer may wish to design a migration plan (e.g., upgrading from cooper to fiber) for the DS1 channels that are currently carried over copper facilities to various cell sites. The type of facility for each local loop associated with each DS1 to a cell site must then be determined. Once the local loop information is available, the network engineer may then finalize the migration plan based on the type of facility, length of copper facility, number of DS1s at each cell site, etc. Thus, obtaining the proper local loop information is essential to the accuracy of the migration plan.

In another example, the request may originate from a customer, who may wish to determine the facility type of the transmission channels that are currently supporting the customer's services. For example, the customer may be a cellular service provider and may wish to determine if the network service provider is currently providing the DS1 channel between the cell sites over a copper-based facility, a fiber optic-based facility, or a hybrid-based facility. For example, the cellular service provider may wish to expand services and may wish to upgrade to a DS1 channel that will be carried over a fiber optic facility. The network service provider may then enable the cellular service provider via access to the application server 240 to determine the type of facilities of the local loop for each end of a DS1 channel that is currently provided to the customer in support of the customer's services. This provides a high degree of flexibility and control to the customer. Thus, the cellular service provider may then request an upgrade accordingly based upon the information obtained from the application server 240.

Figure 3:
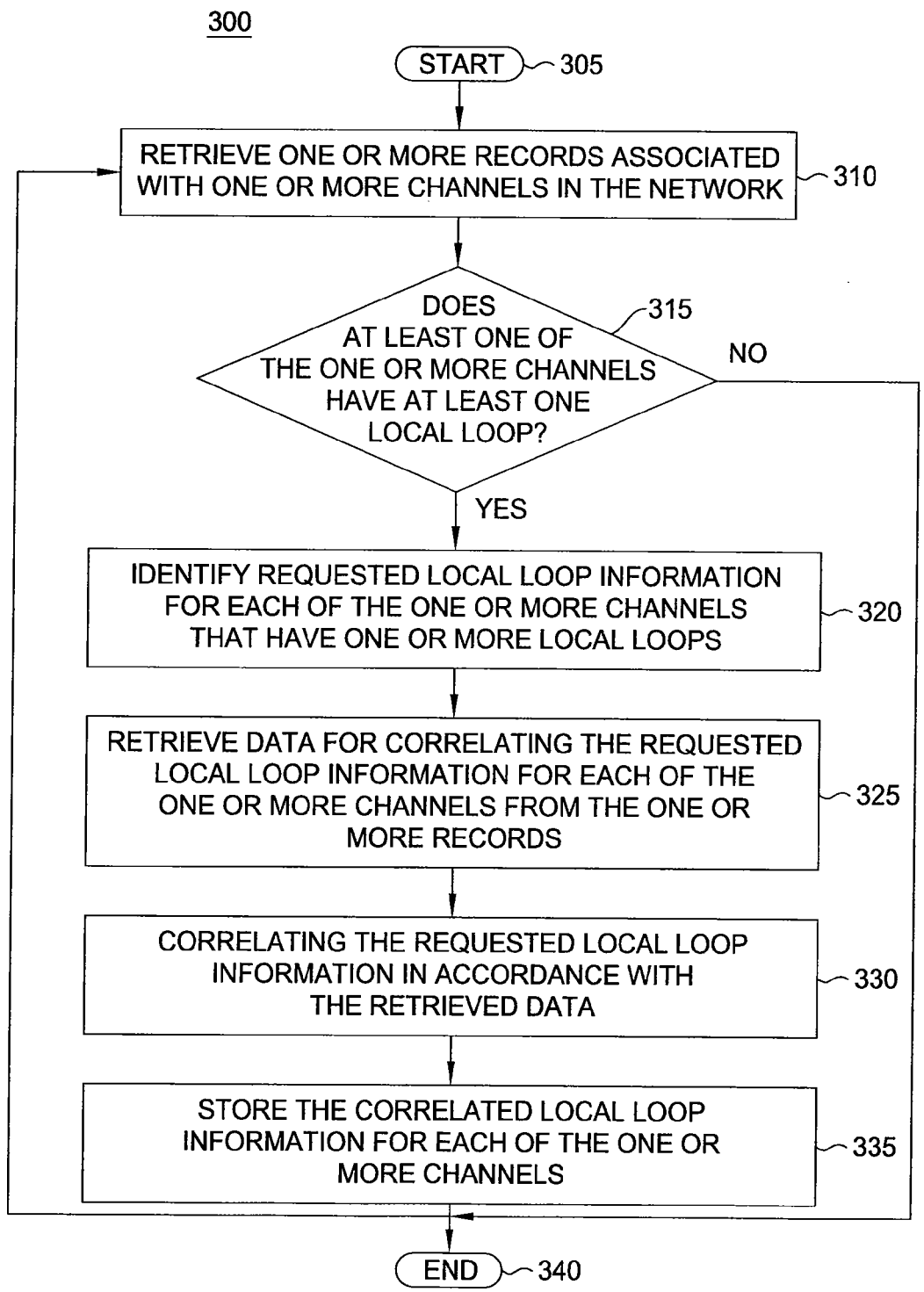
FIG. 3 illustrates a flowchart of an exemplary method for providing local loop information in a network.

FIG. 3 illustrates a flowchart of a method 300 for providing local loop information in a network. For example, one or more steps of method 300 can be implemented by an application server. Method 300 starts in step 305 and proceeds to step 310.

In step 310, method 300 retrieves (e.g., in response to a request) one or more records associated with one or more channels in the network, e.g., Digital Signaling level 1 (DS1) channels. For example, an application server retrieves provisioning records associated with DS1 channels from a database.

In step 315, method 300 determines if each of the one or more channels have one or more local loops. For example, for each DS1 channel, the method may determine whether or not the DS1 channel has one local loop, two local loops or no local loop. For example, if the DS1 channel is between two SWC offices, the DS1 has no local loop. If the DS1 channel is between two cellular sites and the DS1 channel extends from an SWC office to a cellular site ("A" or "Z") at one end, it has one local loop. If the channel extends to the cellular site at both "A" and "Z" sites, the channel has two local loops. If at least one of the one or more channels has at least one local loop, then the method proceeds to step 320. Otherwise, the method proceeds to step 340.

In step 320, method 300 identifies the requested local loop information for each of the one or more channels that has one or more local loops. For example, the method may determine if the requested local loop information for a DS1 channel comprises a facility type (e.g., Copper, fiber or hybrid), a length of the facility, if applicable, a type of customer using the channel, maintenance record of the channel, performance record of the channel, etc.

In step 325, method 300 retrieves data for correlating (or broadly analyzing) the requested local loop information for each of the one or more channels from the one or more records associated with the one or more channels. For example, if the requested local loop information for a DS1 channel is the facility type, the method may first identify each span for each local loop associated with the channel. The method may then retrieve the type of facility for each of the identified spans.

In step 330, method 300 correlates the requested local loop information in accordance with the retrieved data. For the example above, the method may identify the facility type for each local loop of a DS1 channel as being a copper-based facility, a fiber optic-based facility or a hybrid-based facility. For example, if all spans for a local loop comprise only copper-based facilities, then the facility type for the local loop may be identified as a copper facility. If all spans for a local loop comprise only fiber optic-based facilities, then the facility type for the local loop may be identified as fiber-based facilities. If at least one span is fiber and at least one span is copper, then the facility type for the local loop may be identified as hybrid-based.

One aspect of the present invention is that the components of the loop information are often not well correlated. In other words, information related to a particular span is often not correlated in a manner that will allow a user to easily understand or determine the impact of the span information in relation to a transmission channel. In one aspect of the present invention, the present method is able to correlate the span information up to one or more transmission channels, thereby providing insightful results to various queries as discussed above.

In step 335, method 300 stores the correlated requested local loop information for each of the one or more transmission channels. For the example above, for each DS1 channel, the method may store whether the DS1 channel has local loops. If the channel has one or more local loops, the method may then store for each of the local loops, the facility type. For example, a DS1 channel may have a copper-based facility on one end and a hybrid-based facility on the other end. In one embodiment, the method may also store the length of the facility. The method may then return to step 310 to continue retrieving records, or ends in step 340.

Figure 4:
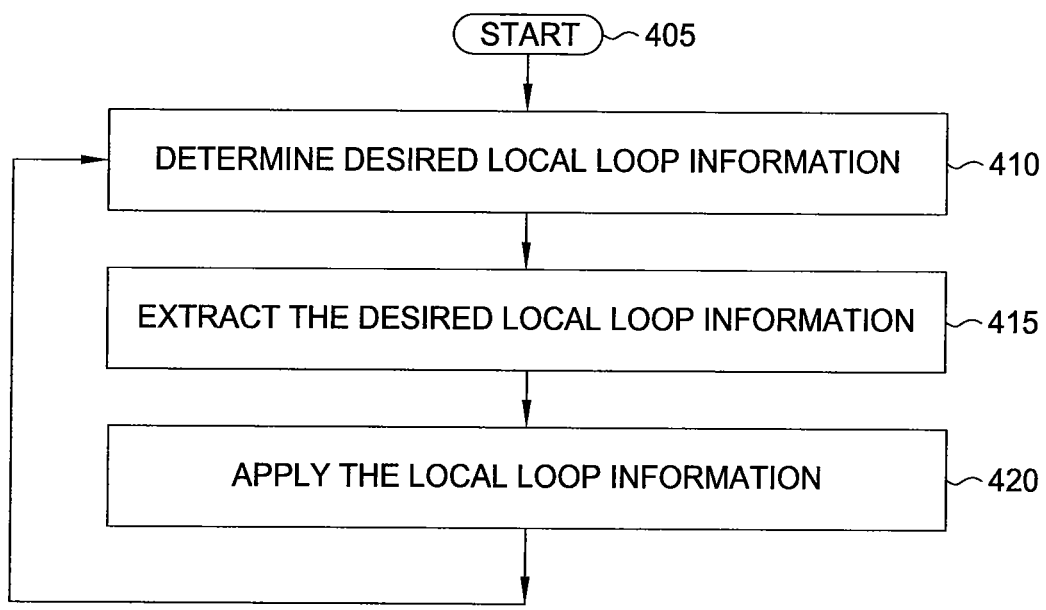
FIG. 4 illustrates a flowchart of an exemplary method for using local loop information.

FIG. 4 illustrates a flowchart of a method 400 for using local loop information. For example, a network engineer may need to determine the local loop information for DS1 channels to plan a network upgrade. In another example, a customer may wish to know the types of facilities that a DS1 channel traverses to reach a customer location (e.g., a cell site). Method 400 starts in step 405 and proceeds to step 410.

In step 410, method 400 determines the desired local loop information. For the example above, the network engineer may determine that the desired information is the facility type of each local loop for a DS1 channel.

In step 415, method 400 extracts the desired local loop information. For example, the method may retrieve the local loop information from a database. For example, an application server may use a DS1 channel's identification to locate local loop information stored in a database.

In step 420, method 400 applies the local loop information. For the example above, the network engineer may use the facility type of each local loop of a DS1 to determine a network upgrade. For example, the network engineer may use the information to determine a migration plan from copper-based facilities to fiber optic-based facilities. The method then returns to step 410.

It should be noted that although not specifically specified, one or more steps of methods 300 and 400 may include a storing, displaying and/or outputting step as required for a particular application. In other words, any data, records, fields, and/or intermediate results discussed in the methods 300 and 400 can be stored, displayed and/or outputted to another device as required for a particular application. Furthermore, steps or blocks in FIG. 3 and FIG. 4 that recite a determining operation, or involve a decision, do not necessarily require that both branches of the determining operation be practiced. In other words, one of the branches of the determining operation can be deemed as an optional step.

Figure 5:
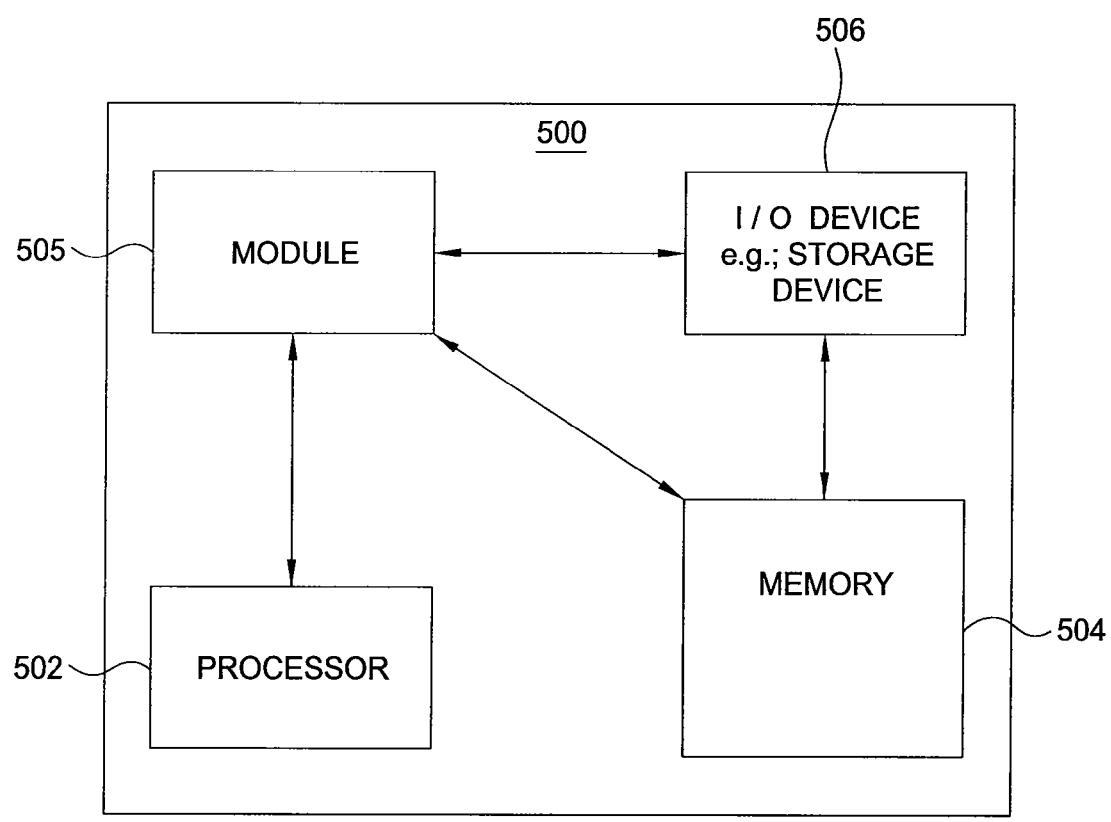
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing local loop information in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing local loop information in a network can be loaded into memory 504 and executed by processor 502 to implement the functions as discussed above. As such, the present method 505 for providing local loop information in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing local loop information in a network, comprising:

receiving, by a processor, a request for the local loop information pertaining to a transmission channel, wherein the transmission channel comprises a digital signaling level 1 channel;

determining, by the processor, whether the transmission channel has a local loop;

retrieving, by the processor, data associated with the local loop when the transmission channel has the local loop, wherein the local loop has a number of spans;

analyzing, by the processor, the data associated with each span of the local loop to determine a facility type that supports the transmission channel, wherein the facility type is determined from among a group comprising of: a copper-based facility type, a fiber optic-based facility type and a hybrid-based facility type, wherein the hybrid-based facility type represents a facility that comprises a first span that employs a copper-based facility and a second span that employs a fiber optic-based facility; and providing, by the processor, a response to the request, the response including the facility type that is determined.

2. The method of claim 1, wherein the analyzing determines a length of a facility associated with the facility type that supports the transmission channel.

3. The method of claim 1, wherein the analyzing further determines a type of customer using the transmission channel.

4. The method of claim 3, wherein the type of customer comprises a point of presence customer.

5. The method of claim 3, wherein the type of customer comprises a resale customer.

6. The method of claim 3, wherein the type of customer comprises a wholesale customer.

7. The method of claim 3, wherein the type of customer comprises an affiliate.

8. The method of claim 1, wherein the analyzing further determines a maintenance record of the transmission channel.

9. A non-transitory tangible computer-readable medium storing instructions which, when executed by a processor, cause the processor to perform operations for providing local loop information in a network, the operations comprising:

receiving a request for the local loop information pertaining to a transmission channel, wherein the transmission channel comprises a digital signaling level 1 channel;

determining whether the transmission channel has a local loop;

retrieving data associated with the local loop when the transmission channel has the local loop, wherein the local loop has a number of spans;

analyzing the data associated with each span of the local loop to determine a facility type that supports the transmission channel, wherein the facility type is determined from among a group comprising of: a copper-based facility type, a fiber optic-based facility type and a hybrid-based facility type, wherein the hybrid-based facility type represents a facility that comprises a first span that employs a copper-based facility and a second span that employs a fiber optic-based facility; and providing a response to the request, the response including the facility type that is determined.

10. The tangible computer-readable medium of claim 9, wherein the analyzing determines a length of a facility associated with the facility type that supports the transmission channel.

11. The tangible computer-readable medium of claim 9, wherein the analyzing further determines a type of customer using the transmission channel.

12. The tangible computer-readable medium of claim 11, wherein the type of customer comprises a point of presence customer.

13. The tangible computer-readable medium of claim 9, wherein the analyzing further determines a maintenance record of the transmission channel.

14. A system for providing local loop information in a network, comprising:
   an application server for receiving a request for the local loop information pertaining to a transmission channel, wherein the transmission channel comprises a digital signaling level 1 channel, where the application server determines whether the transmission channel has a local loop, where the application server retrieves data associated with the local loop when the transmission channel has the local loop, wherein the local loop has a number of spans, where the application server analyzes the data associated with each span of the local loop to determine a facility type that supports the transmission channel, wherein the facility type is determined from among a group comprising of: a copper-based facility type, a fiber optic-based facility type and a hybrid-based facility type, wherein the hybrid-based facility type represents a facility that comprises a first span that employs a copper-based facility and a second span that employs a fiber optic-based facility, and where the application server provides a response to the request, the response including the facility type that is determined.

* * * * *